(12) United States Patent
Bialer

(10) Patent No.: US 10,338,208 B2
(45) Date of Patent: Jul. 2, 2019

(54) OBJECT DETECTION IN MULTIPLE RADARS

(71) Applicant: GM GLOBAL TECHNOLOGY OPERATIONS LLC, Detroit, MI (US)

(72) Inventor: Oded Bialer, Petah Tivak (IL)

(73) Assignee: GM Global Technology Operations LLC, Detroit, MI (US)

( * ) Notice: Subject to any disclaimer, the term of this patent is extended or adjusted under 35 U.S.C. 154(b) by 321 days.

(21) Appl. No.: 15/335,974

(22) Filed: Oct. 27, 2016

(65) Prior Publication Data

US 2018/0120429 A1    May 3, 2018

(51) Int. Cl.
| | |
|---|---|
| *G01S 13/68* | (2006.01) |
| *G01S 13/58* | (2006.01) |
| *G01S 13/87* | (2006.01) |
| *G01S 13/93* | (2006.01) |
| *G01S 13/04* | (2006.01) |
| *G01S 13/60* | (2006.01) |
| *G01S 7/41* | (2006.01) |
| *G01S 13/72* | (2006.01) |

(52) U.S. Cl.
CPC .............. *G01S 13/68* (2013.01); *G01S 13/58* (2013.01); *G01S 13/726* (2013.01); *G01S 13/87* (2013.01); *G01S 13/931* (2013.01); *G01S 7/414* (2013.01); *G01S 13/04* (2013.01); *G01S 13/584* (2013.01); *G01S 13/60* (2013.01)

(58) Field of Classification Search
CPC .......... G01S 13/931; G01S 2013/9353; G01S 13/867; G01S 17/936; G01S 2013/9346; G01S 2013/9375; G01S 13/42; G01S 2013/9342; G01S 2013/9378; G01S 7/415; G01S 13/58; G01S 13/584; G01S 13/726; G01S 13/86; G01S 13/865; G01S 2013/9321; G01S 13/52; G01S 7/414; G01S 17/58; G01S 13/92; G01S 17/89; G01S 7/4802; G01S 7/4808; G01S 17/50; G01S 13/60; G01S 13/887; G01S 13/04; G01S 7/292; G01S 13/951; G01S 15/58; G01S 7/52026; B60W 2520/14; B60W 2420/52

See application file for complete search history.

(56) References Cited

U.S. PATENT DOCUMENTS

| | | | | |
|---|---|---|---|---|
| 7,636,625 | B2 * | 12/2009 | Weber ................. | B60R 21/0132 180/167 |
| 2010/0097200 | A1 * | 4/2010 | Hilsebecher ............ | G01S 7/412 340/436 |
| 2013/0181860 | A1 * | 7/2013 | Le .......................... | G01S 13/931 342/72 |
| 2014/0368807 | A1 * | 12/2014 | Rogan ..................... | G01S 17/50 356/28 |
| 2015/0183431 | A1 * | 7/2015 | Nanami ................ | B60W 40/04 701/301 |

(Continued)

*Primary Examiner* — Olumide Ajibade Akonai
(74) *Attorney, Agent, or Firm* — Lorenz & Kopf LLP

(57) ABSTRACT

Methods and systems are provided for controlling a radar system of a vehicle. One or more transmitters are configured to transmit radar signals. A plurality of receivers are configured to receive return radar signals after the transmitted radar signals are deflected from an object proximate the vehicle. A processor is coupled to the plurality of receivers in order to determine when a plurality of detected objects correspond to a single object and to track the single object in a dynamic environment.

10 Claims, 6 Drawing Sheets

(56) References Cited

U.S. PATENT DOCUMENTS

| | | | |
|---|---|---|---|
| 2015/0234044 A1* | 8/2015 | Ouchi | G01S 13/93 342/27 |
| 2016/0042645 A1* | 2/2016 | Harada | G01S 13/867 701/117 |
| 2016/0077195 A1* | 3/2016 | Chang | G01S 7/42 342/194 |
| 2017/0369034 A1* | 12/2017 | Bilik | B60R 25/34 |

* cited by examiner

OBJECT DETECTION IN MULTIPLE RADARS

TECHNICAL FIELD

The present disclosure generally relates to vehicles, and more particularly relates to methods and radar systems for vehicles.

BACKGROUND

Certain vehicles today utilize radar systems. For example, certain vehicles utilize radar systems to detect other vehicles, pedestrians, or other objects on a road in which the vehicle is travelling. Radar systems may be used in this manner, for example, in implementing automatic braking systems, adaptive cruise control, and avoidance features, among other vehicle features. Certain vehicle radar systems, called multiple input, multiple output (MIMO) radar systems, have multiple transmitters and receivers. While radar systems are generally useful for such vehicle features, in certain situations existing radar systems may have certain limitations.

Accordingly, it is desirable to provide improved techniques for radar system performance in vehicles, for example for classification of objects using MIMO radar systems and, in particular, to reduce the number of objects actively tracked by the radars. It is also desirable to provide methods, systems, and vehicles utilizing such techniques. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided for controlling a radar system of a vehicle, the radar system having a plurality of receivers. The method comprises receiving a first plurality of radar echoes indicating a first target point, a second target point, a third target point, and a fourth target point, determining a first velocity associated with the first target point, a second velocity associated with the second target point, a third velocity associated with the third target point, and a fourth velocity associated with the fourth target point, establishing a first cluster in response to the first velocity and the second velocity being similar and the first target point and the second target point having a close proximity, establishing a second cluster in response to the third velocity and the fourth velocity being similar and the third target point and the fourth target point having a close proximity, tracking the first cluster and the second cluster in response to a second plurality of radar echoes.

In accordance with an exemplary embodiment, a radar control system for a vehicle is provided. The radar apparatus comprises a transmitter for transmitting a first plurality of radar pulses and a second plurality of radar pulses, a receiver for receiving a first plurality of radar echoes corresponding to a plurality of object detection points, the receiver further operative to receive a second plurality of radar echoes, a cluster processor for determining a location and a velocity for each of the plurality of object detection points and for determining a first cluster from at least one of the plurality of object detection points and for determining a second cluster from at least one other of the plurality of object detection points wherein the first cluster and the second cluster are determined in response to the location and the velocity of each of the plurality of object detection points, and a memory for storing a first velocity and a first location associated with the first cluster and a second velocity and a second location associated with the second cluster, and a tracking processor for accessing the memory and tracking the first cluster and the second cluster and for updating the first velocity and the first location and the second velocity and the second location in response to the second plurality of radar echoes In accordance with an exemplary embodiment, an apparatus is provided. The apparatus comprises an antenna for receiving a first plurality of radar echoes indicating a first target point, a second target point, a third target point, and a fourth target point and a second plurality of radar echoes, a memory for storing a tracking list, and a processor for determining a first velocity associated with the first target point, a second velocity associated with the second target point, a third velocity associated with the third target point, and a fourth velocity associated with the fourth target point, establishing a first cluster in response to the first velocity and the second velocity being similar and the first target point and the second target point having a close proximity, establishing a second cluster in response to the third velocity and the fourth velocity being similar and the third target point and the fourth target point having a close proximity, the processor further operative to add the first cluster and the second cluster to the tracking list, and to tracking the first cluster and the second cluster in response to a second plurality of radar echoes.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
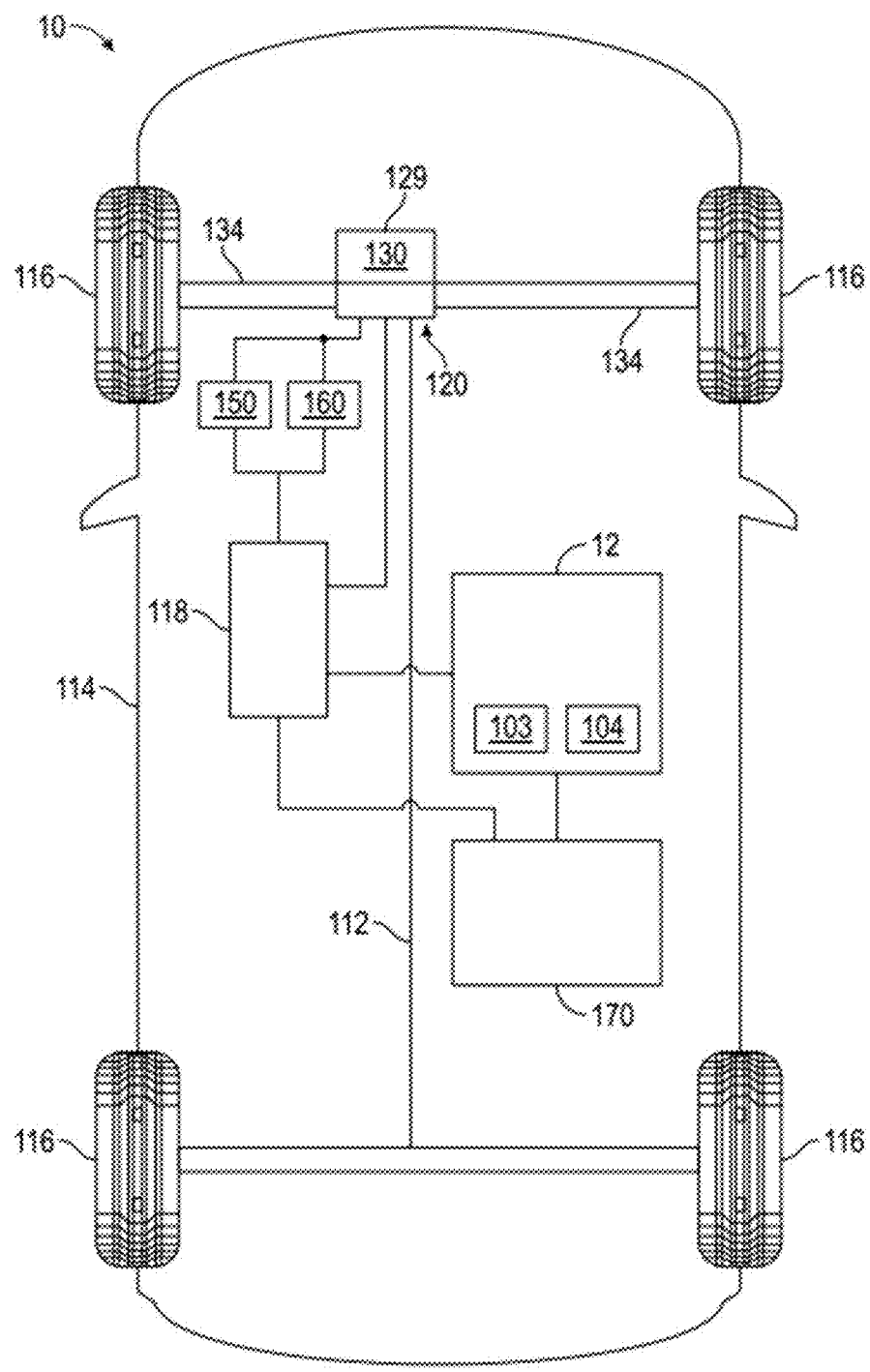
FIG. 1 is a functional block diagram of a vehicle having a control system, including a radar system, in accordance with an exemplary embodiment.

FIG. 1 provides a functional block diagram of vehicle 10, in accordance with an exemplary embodiment. As described in further detail greater below, the vehicle 10 includes a radar control system 12 having a radar system 103 and a controller 104 that classifies objects based upon a three dimensional representation of the objects using received radar signals of the radar system 103.

In the depicted embodiment, the vehicle 10 also includes a chassis 112, a body 114, four wheels 116, an electronic control system 118, a steering system 150, and a braking system 160. The body 114 is arranged on the chassis 112 and substantially encloses the other components of the vehicle 10. The body 114 and the chassis 112 may jointly form a frame. The wheels 116 are each rotationally coupled to the chassis 112 near a respective corner of the body 114.

In the exemplary embodiment illustrated in FIG. 1, the vehicle 10 includes an actuator assembly 120. The actuator assembly 120 includes at least one propulsion system 129 mounted on the chassis 112 that drives the wheels 116. In the depicted embodiment, the actuator assembly 120 includes an engine 130. In one embodiment, the engine 130 comprises a combustion engine. In other embodiments, the actuator assembly 120 may include one or more other types of engines and/or motors, such as an electric motor/generator, instead of or in addition to the combustion engine.

Still referring to FIG. 1, the engine 130 is coupled to at least some of the wheels 116 through one or more drive shafts 134. In some embodiments, the engine 130 is also mechanically coupled to a transmission. In other embodiments, the engine 130 may instead be coupled to a generator used to power an electric motor that is mechanically coupled to a transmission.

The steering system 150 is mounted on the chassis 112, and controls steering of the wheels 116. The steering system 150 includes a steering wheel and a steering column (not depicted). The steering wheel receives inputs from a driver of the vehicle 10. The steering column results in desired steering angles for the wheels 116 via the drive shafts 134 based on the inputs from the driver.

The braking system 160 is mounted on the chassis 112, and provides braking for the vehicle 10. The braking system 160 receives inputs from the driver via a brake pedal (not depicted), and provides appropriate braking via brake units (also not depicted). The driver also provides inputs via an accelerator pedal (not depicted) as to a desired speed or acceleration of the vehicle 10, as well as various other inputs for various vehicle devices and/or systems, such as one or more vehicle radios, other entertainment or infotainment systems, environmental control systems, lightning units, navigation systems, and the like (not depicted in FIG. 1).

Also as depicted in FIG. 1, in certain embodiments the vehicle 10 may also include a telematics system 170. In one such embodiment the telematics system 170 is an onboard device that provides a variety of services through communication with a call center (not depicted) remote from the vehicle 10. In various embodiments the telematics system may include, among other features, various non-depicted features such as an electronic processing device, one or more types of electronic memory, a cellular chipset/component, a wireless modem, a dual mode antenna, and a navigation unit containing a GPS chipset/component. In certain embodiments, certain of such components may be included in the controller 104, for example as discussed further below in connection with FIG. 2. The telematics system 170 may provide various services including: turn-by-turn directions and other navigation-related services provided in conjunction with the GPS chipset/component, airbag deployment notification and other emergency or roadside assistance-related services provided in connection with various sensors and/or sensor interface modules located throughout the vehicle, and/or infotainment-related services such as music, internet web pages, movies, television programs, videogames, and/or other content.

The radar control system 12 is mounted on the chassis 112. As mentioned above, the radar control system 12 classifies objects based upon a three dimensional representation of the objects using received radar signals of the radar system 103. In one example, the radar control system 12 provides these functions in accordance with the method 400 described further below in connection with FIG. 4.

While the radar control system 12, the radar system 103, and the controller 104 are depicted as being part of the same system, it will be appreciated that in certain embodiments these features may comprise two or more systems. In addition, in various embodiments the radar control system 12 may comprise all or part of, and/or may be coupled to, various other vehicle devices and systems, such as, among others, the actuator assembly 120, and/or the electronic control system 118.

Figure 2:
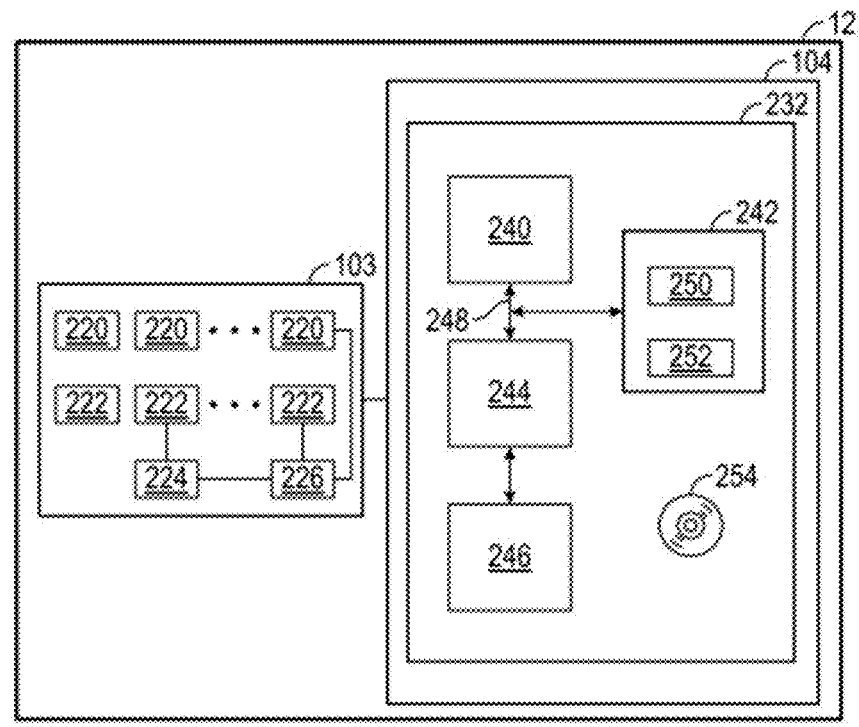
FIG. 2 is a functional block diagram of the control system of the vehicle of FIG. 1, including the radar system, in accordance with an exemplary embodiment.

With reference to FIG. 2, a functional block diagram is provided for the radar control system 12 of FIG. 1, in accordance with an exemplary embodiment. As noted above, the radar control system 12 includes the radar system 103 and the controller 104 of FIG. 1.

As depicted in FIG. 2, the radar system 103 includes one or more transmitters 220, one or more receivers 222, a memory 224, and a processing unit 226. In the depicted embodiment, the radar system 103 comprises a multiple input, multiple output (MIMO) radar system with multiple transmitters (also referred to herein as transmission channels) 220 and multiple receivers (also referred to herein as receiving channels) 222. The transmitters 220 transmit radar signals for the radar system 103. After the transmitted radar signals contact one or more objects on or near a road on which the vehicle 10 is travelling and is reflected/redirected toward the radar system 103, the redirected radar signals are received by the receivers 222 of the radar system 103 for processing.

Figure 3:
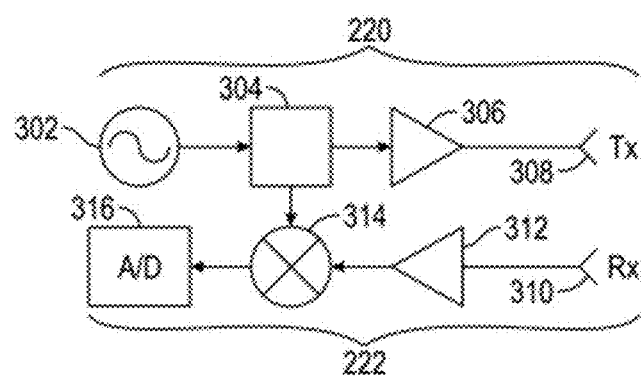
FIG. 3 is a functional block diagram of a transmission channel and a receiving channel of the radar system of FIGS. 1 and 2, in accordance with an exemplary embodiment.

With reference to FIG. 3, a representative one of the transmission channels 220 is depicted along with a respective one of the receiving channels 222 of the radar system of FIG. 3, in accordance with an exemplary embodiment. As depicted in FIG. 3, each transmitting channel 220 includes a signal generator 302, a filter 304, an amplifier 306, and an antenna 308. Also as depicted in FIG. 3, each receiving channel 222 includes an antenna 310, an amplifier 312, a mixer 314, and a sampler/digitizer 316. In certain embodiments the antennas 308, 310 may comprise a single antenna, while in other embodiments the antennas 308, 310 may comprise separate antennas. Similarly, in certain embodiments the amplifiers 306, 312 may comprise a single amplifier, while in other embodiments the amplifiers 306, 312 may comprise separate amplifiers. In addition, in certain embodiments multiple transmitting channels 220 may share one or more of the signal generators 302, filters 304, amplifiers 306, and/or antennae 308. Likewise, in certain embodiments, multiple receiving channels 222 may share one or more of the antennae 310, amplifiers 312, mixers 314, and/or samplers/digitizers 316.

The radar system 103 generates the transmittal radar signals via the signal generator(s) 302. The transmittal radar signals are filtered via the filter(s) 304, amplified via the amplifier(s) 306, and transmitted from the radar system 103 (and from the vehicle 10 to which the radar system 103 belongs, also referred to herein as the "host vehicle") via the antenna(e) 308. The transmitting radar signals subsequently contact other vehicles and/or other objects on or alongside the road on which the host vehicle 10 is travelling. After contacting the other vehicles and/or other objects, the radar signals are reflected, and travel from the other vehicles and/or other objects in various directions, including some signals returning toward the host vehicle 10. The radar signals returning to the host vehicle 10 (also referred to herein as received radar signals) are received by the antenna(e) 310, amplified by the amplifier(s) 312, mixed by the mixer(s) 314, and digitized by the sampler(s)/digitizer(s) 316.

Returning to FIG. 2, the radar system 103 also includes, among other possible features, the memory 224 and the processing unit 226. The memory 224 stores information received by the receiver 222 and/or the processing unit 226. In certain embodiments, such functions may be performed, in whole or in part, by a memory 242 of a computer system 232 (discussed further below).

The processing unit 226 processes the information obtained by the receivers 222 for classification of objects based upon a three dimensional representation of the objects using received radar signals of the radar system 103. The processing unit 226 of the illustrated embodiment is capable of executing one or more programs (i.e., running software) to perform various tasks instructions encoded in the program(s). The processing unit 226 may include one or more microprocessors, microcontrollers, application specific integrated circuits (ASICs), or other suitable device as realized by those skilled in the art, such as, by way of example, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

In certain embodiments, the radar system 103 may include multiple memories 224 and/or processing units 226, working together or separately, as is also realized by those skilled in the art. In addition, it is noted that in certain embodiments, the functions of the memory 224, and/or the processing unit 226 may be performed in whole or in part by one or more other memories, interfaces, and/or processors disposed outside the radar system 103, such as the memory 242 and the processor 240 of the controller 104 described further below.

As depicted in FIG. 2, the controller 104 is coupled to the radar system 103. Similar to the discussion above, in certain embodiments the controller 104 may be disposed in whole or in part within or as part of the radar system 103. In addition, in certain embodiments, the controller 104 is also coupled to one or more other vehicle systems (such as the electronic control system 118 of FIG. 1). The controller 104 receives and processes the information sensed or determined from the radar system 103, provides detection, classification, and tracking of based upon a three dimensional representation of the objects using received radar signals of the radar system 103, and implements appropriate vehicle actions based on this information. The controller 104 generally performs these functions in accordance with the method 400 discussed further below in connection with FIGS. 4-6.

As depicted in FIG. 2, the controller 104 comprises the computer system 232. In certain embodiments, the controller 104 may also include the radar system 103, one or more components thereof, and/or one or more other systems. In addition, it will be appreciated that the controller 104 may otherwise differ from the embodiment depicted in FIG. 2. For example, the controller 104 may be coupled to or may otherwise utilize one or more remote computer systems and/or other control systems, such as the electronic control system 118 of FIG. 1.

As depicted in FIG. 2, the computer system 232 includes the processor 240, the memory 242, an interface 244, a storage device 246, and a bus 248. The processor 240 performs the computation and control functions of the controller 104, and may comprise any type of processor or multiple processors, single integrated circuits such as a microprocessor, or any suitable number of integrated circuit devices and/or circuit boards working in cooperation to accomplish the functions of a processing unit. In one embodiment, the processor 240 classifies objects using radar signal spectrogram data in combination with one or more computer vision models. During operation, the processor 240 executes one or more programs 250 contained within the memory 242 and, as such, controls the general operation of the controller 104 and the computer system 232, generally in executing the processes described herein, such as those of the method 400 described further below in connection with FIGS. 4-6.

The memory 242 can be any type of suitable memory. This would include the various types of dynamic random access memory (DRAM) such as SDRAM, the various types of static RAM (SRAM), and the various types of non-volatile memory (PROM, EPROM, and flash). In certain examples, the memory 242 is located on and/or co-located on the same computer chip as the processor 240. In the depicted embodiment, the memory 242 stores the above-referenced program 250 along with one or more stored values 252 (such as, by way of example, information from the received radar signals and the spectrograms therefrom).

The bus 248 serves to transmit programs, data, status and other information or signals between the various components of the computer system 232. The interface 244 allows communication to the computer system 232, for example from a system driver and/or another computer system, and can be implemented using any suitable method and apparatus. The interface 244 can include one or more network interfaces to communicate with other systems or components. In one embodiment, the interface 244 includes a transceiver. The interface 244 may also include one or more network interfaces to communicate with technicians, and/or one or more storage interfaces to connect to storage apparatuses, such as the storage device 246.

The storage device 246 can be any suitable type of storage apparatus, including direct access storage devices such as hard disk drives, flash systems, floppy disk drives and optical disk drives. In one exemplary embodiment, the storage device 246 comprises a program product from which memory 242 can receive a program 250 that executes one or more embodiments of one or more processes of the present disclosure, such as the method 400 (and any sub-processes thereof) described further below in connection with FIGS. 4-6. In another exemplary embodiment, the program product may be directly stored in and/or otherwise accessed by the memory 242 and/or a disk (e.g., disk 254), such as that referenced below.

The bus 248 can be any suitable physical or logical means of connecting computer systems and components. This includes, but is not limited to, direct hard-wired connections, fiber optics, infrared and wireless bus technologies. During operation, the program 250 is stored in the memory 242 and executed by the processor 240.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 240) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system 232 may also otherwise differ from the embodiment depicted in FIG. 2, for example in that the computer system 232 may be coupled to or may otherwise utilize one or more remote computer systems and/or other control systems.

Figure 4A:
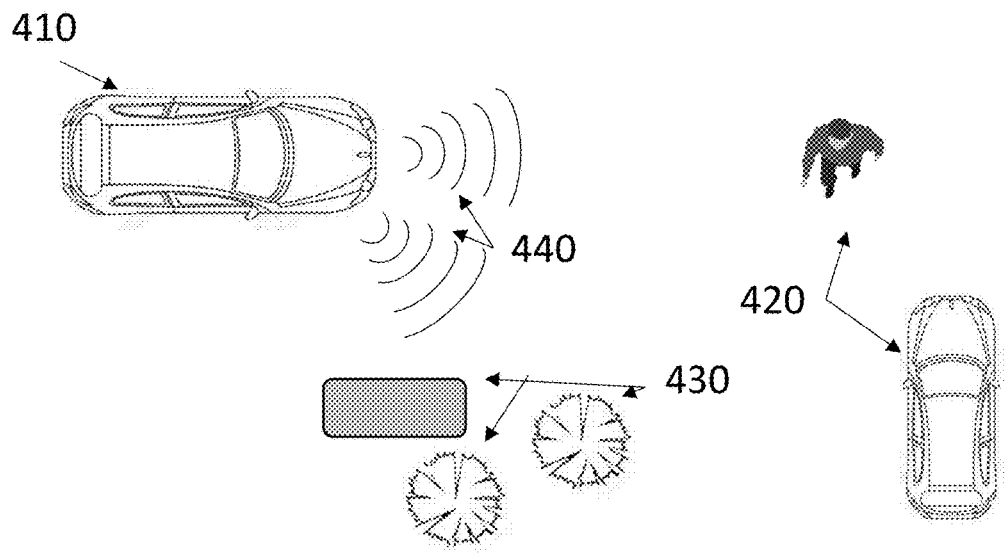
FIG. 4A shows an exemplary environment for implementing a system and method for static clutter mitigation for dynamic target localization in accordance with an exemplary embodiment.

Turning now to FIG. 4A, an exemplary environment for implementing a system and method for static clutter mitigation for dynamic target localization is shown. FIG. 4A depicts an environment with a radar equipped vehicle 410, transmitting and receiving radar pulses 440. The environment further comprises dynamic, or moving, targets 420 and static, or stationary, targets 430. For a radar equipped vehicle, the typical operating environment is extremely dense, with a majority of targets being static, such as the road, buildings, parked vehicles, trees, etc. Thus, mapping of the environment in the presence of both dynamic and static objects is a challenging task due to requirements for the efficient radar resource allocation.

Figure 4B:
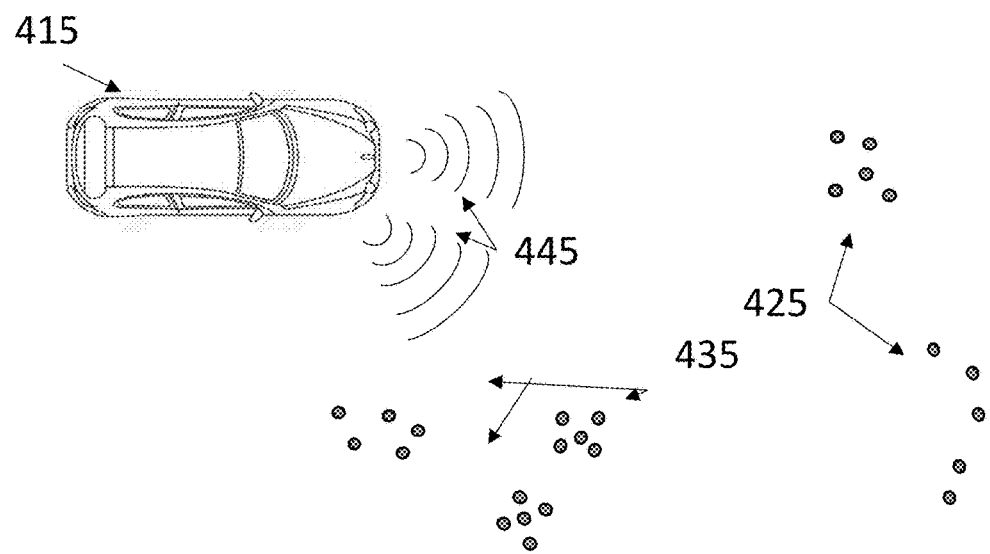
FIG. 4B shows an exemplary environment for implementing a system and method for static clutter mitigation for dynamic target localization wherein the targets are displayed as target detections over a number of radar cycles in accordance with an exemplary embodiment.

FIG. 4B depicts the environment in wherein the targets are displayed as target detections over a number of radar cycles. The radar equipped vehicle 415 is operative to transmit and receive radar pulses 445. The targets are now represented by a number of target detections, including dynamic 425 and stationary 435 targets. Targets detected are represented as a cluster of detection points due to movement of the vehicle and the target, nonuniformity of the targets and noise in the system and environment among other things.

The ability to accurately localize and classify objects is partially dependent on the observation interval. Thus, static clutter can be localized much more accurately than moving objects. It would be desirable to exploit the ability to accurately detect and localize static clutter to "clean up" the cluttered scene in order to improve dynamic objects detection and localization.

Figure 5:
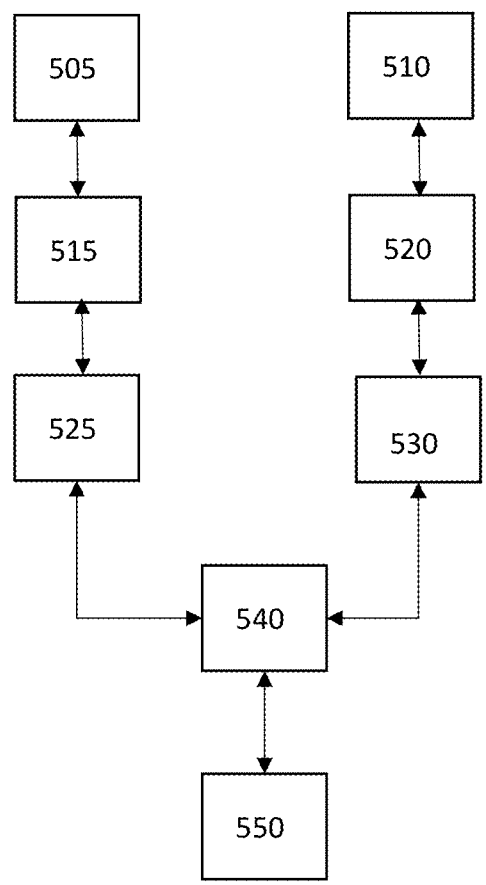
FIG. 5 shows an apparatus for static clutter mitigation for dynamic target localization 500.

Turning now to FIG. 5, an apparatus for static clutter mitigation for dynamic target localization 500 is shown. The apparatus is, according to an exemplary embodiment, operative to localize the objects within a field of view. The apparatus is used to, localize, or determine the position, of the objects by determining their position either relative to the host vehicle or to some global reference coordinate. Localizing may include determining the range azimuth and elevation angles of the target with respect to the host vehicle and its velocity. Furthermore, the apparatus 500 may be operative to determine which objects are static and what are dynamic helps in scene understanding, since there are very many radar echoes form static objects and much less from dynamic, in terms of computational complexity it requires to make sure that we allocate sufficient resources to dynamic objects. In addition, processing of radar echoes form dynamic vs. static objects may be very different. Typical scenario for automotive radar consists of multiple every strong, large size, echoes form static objects and few much weaker, small size, such as pedestrian, dynamic objects. Thus static objects can mask dynamic objects. Therefore it would be desirable to first to filter our radar echoes from the static object in order to detect dynamic objects.

The apparatus 500 has a first antenna 505 and a second antenna 510 for transmitting and receiving radar pulses. The antennas may be a single element antenna or an array of antenna elements, such as an antenna array wherein the elements of the antenna array are connected in a way in order to combine the received signals in a specified amplitude and phase relationships. Each of the antenna elements may be coupled to an amplifier and/or phase shifter.

Each of the first antenna 505 and the second antenna 510 may be a phased array, which employs a plurality of fixed antenna elements in which the relative phases of the respective signals fed to the fixed antenna elements may be adjusted in a way which alters the effective radiation pattern of the antenna array such the gain of the array is reinforced in a desired direction and suppressed in undesired directions. This has the desirable effect of allowing a stationary antenna array to be incorporated into a vehicle body while still allowing the field of view of the antenna to be increased.

The first antenna 505 and the second antenna 510 are coupled to a first A/D converter 515 and a second A/D converter 520 respectively. The first A/D converter 515 and the second A/D converter 520 are operative to convert the received radar echoes in the signal return path to a digital representation of the received radar echoes. The digital representations of the received radar echoes are coupled to a first digital signal processor 525 and a second digital signal processor 530 for further signal processing. The outputs of the first digital signal processor 525 and a second digital signal processor 530 are coupled to a joint signal processor 540.

The joint signal processor 540 is operative to process the data received from the first digital signal processor 525 and a second digital signal processor 530 in order to perform object detection, object determination and recognition and parameter estimation. The joint signal processor 540 is further operative to track the determined objects according to aspects of the exemplary embodiments. The joint signal processor 540 may then generate an object list which is stored to memory 505 and may further be operative to generate an object map used for autonomous driving and/or obstacle avoidance.

Figure 6:
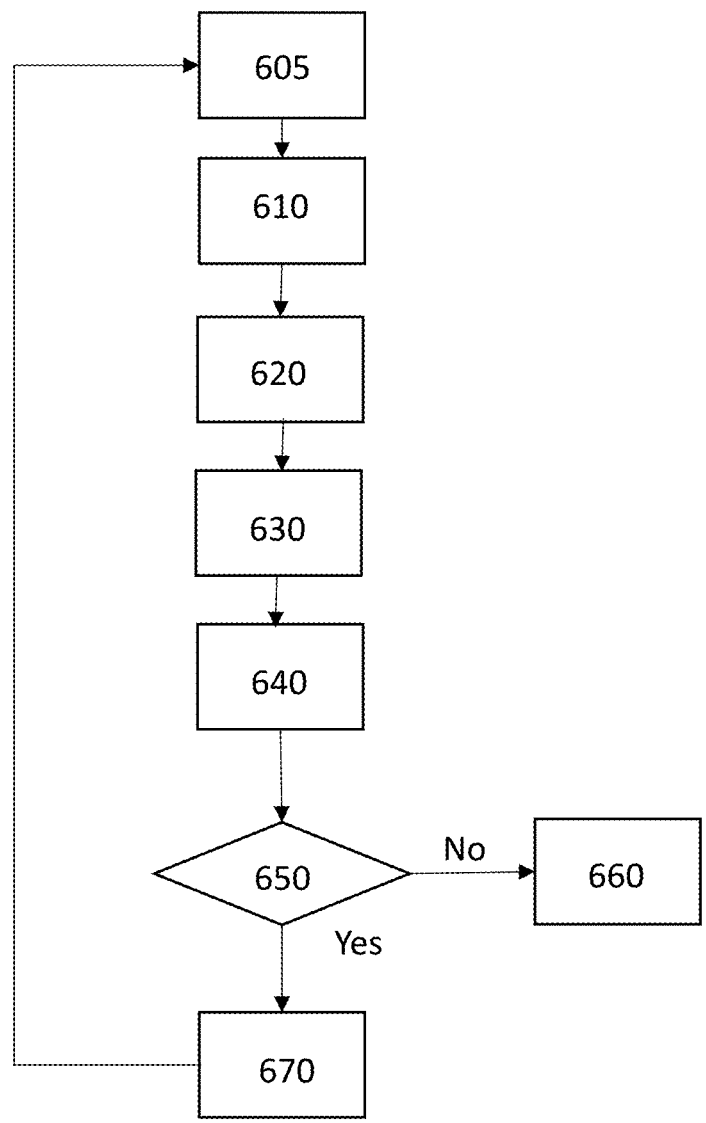
FIG. 6 shows a flowchart of a method for static clutter mitigation for dynamic target localization in accordance with an exemplary embodiment.

Turning now to FIG. 6, a flowchart of a method for static clutter mitigation for dynamic target localization 600 is shown. The proposed method has the desired benefits of increased accuracy of localization of the both static and dynamic objects, simplification of the complex scene perception, and optimized radar resource management. The radar systems are first operative to transmit and receive operate at a short observation time 605. The radar system then accumulates in memory, the location and velocity of the determined detections 610.

The method is then operative to cluster the detections into objects in response to the location and the velocity of the detections 620. For example, if the detections are proximate to each other, and they are have similar velocities, it may be assumed that the detections are all on the same object. Therefore, this cluster of detections are then saved as a single object for tracking purposes.

The method is then operative to estimate if objects are dynamic or static taking into account the vehicle velocity and the angular location of the objects with respect to the vehicle 630. The system is then operative to transmit and receive radar pulses over a longer observation time 640. Over the longer observation time, the dynamic clusters may spread in the Doppler and the static objects can be more accurately localized.

The method is then operative to determine if an object is static or dynamic 650. If an object is determined to be static, the method may either discard the object from tracking, radar echoes from the static object may be cancelled by the processor, and/or the location of the static objects may be saved to a memory 660. The static object may be represented in a mapping of the environment for autonomous driving operations. Once the static objects are identified, the remaining dynamic objects are then tracked and more accurately estimated and localized 670 due to the reduced processing requirements for object tracking. After a period of time, the method may be operative to repeat the procedure in order to determine the location of new objects entering the environment.

Figure 7:
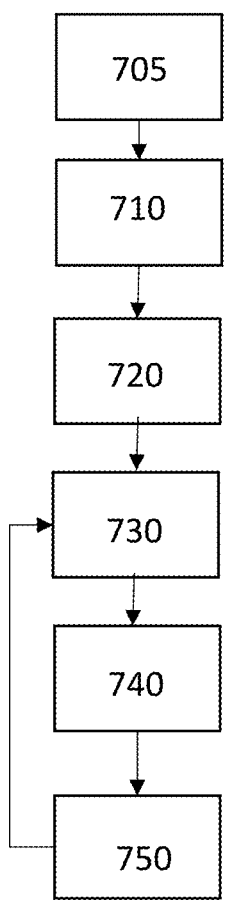
FIG. 7 shows a method for clustering a plurality of radar echoes in accordance with an exemplary embodiment.

Turning now to FIG. 7, a method for clustering a plurality of radar echoes 700 is shown. The method is first operative to transmit a first plurality of radar pulses and to receive a first plurality of radar echoes corresponding to the first plurality of radar pulses 705. The method then processes the first plurality of radar echoes to determine a location and velocity for objects detected within the field of view of the radar 710. A method then compares the locations and velocities of the detected objects to determine if any of the detected objects are multiple detections of the same object 720, and if so, classifies the objects into a cluster. For example, if two proximate detected objects have the same velocity, where the velocity indicates speed and direction, then the system assumes that the proximate detected objects are one object and generates a cluster indicative of the object. The method then updates a list of object to be tracked, with the location and velocity of the cluster 730. An average velocity for an object may be calculated for a cluster over a number of radar echoes. Thus, from the average velocity of the cluster, the object may be determined to be static or dynamic.

The method is then operative to transmit a second plurality of radar pulses and to receive a second plurality of radar echoes corresponding to the cluster 740. The method is then operative to determine the location and velocity of the cluster 740 and to update the list of object to be tracked 730. Periodically, the system is operative to return to step 705 and to generate a new list of detected objects and clusters do establish if any new objects have entered the field of view or to determine if a determined cluster was multiple objects, or to determine if multiple clusters were a single object. The tracking may be performed by a tracking processor, such as the joint signal processor 540 of FIG. 5, or a single processor may be used in place of the first digital signal processor 525 and a second digital signal processor 530 and the joint signal processor 540 of FIG. 5.

It will be appreciated that the disclosed methods, systems, and vehicles may vary from those depicted in the Figures and described herein. For example, the vehicle 10, the radar control system 12, the radar system 103, the controller 104, and/or various components thereof may vary from that depicted in FIGS. 1-3 and described in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

What is claimed is:

1. A method of processing radar target points comprising:
receiving a first plurality of radar echoes indicating a first target point, a second target point, a third target point, and a fourth target point;
determining a first velocity associated with the first target point, a second velocity associated with the second target point, a third velocity associated with the third target point, and a fourth velocity associated with the fourth target point;
establishing a first cluster in response to the first velocity and the second velocity being similar and the first target point and the second target point having a close proximity;
establishing a second cluster in response to the third velocity and the fourth velocity being similar and the third target point and the fourth target point having a close proximity;
tracking the first cluster and the second cluster in response to a second plurality of radar echoes;
identifying the first cluster as a dynamic object in response to an average first velocity and the second cluster as a static object in response to an average second velocity; and
discontinuing tracking of the second cluster in response to the second object being identified as a static object.

2. The method of claim 1 wherein the first velocity indicates a first direction and a first speed, the second velocity indicates a second direction and a second speed, the third velocity indicates a third direction and a third speed, and the fourth velocity indicates a fourth direction and a fourth speed.

3. The method of claim 1 wherein the first target point and the second target point being proximate is indicated by an average distance over a time duration.

4. The method of claim 1 wherein the first target point and the second target point are deemed proximate in response to an average first velocity and an average second velocity.

5. The method of claim 1, further comprising storing the location of the static object in a nontransient data memory.

6. The method of claim 5, further comprising representing the static object in an map of a local environment.

7. An apparatus comprising:
an antenna for receiving a first plurality of radar echoes indicating a first target point, a second target point, a third target point, and a fourth target point and a second plurality of radar echoes;
a memory for storing a tracking list; and
a processor for determining a first velocity associated with the first target point, a second velocity associated with the second target point, a third velocity associated with the third target point, and a fourth velocity associated with the fourth target point, establishing a first cluster in response to the first velocity and the second velocity being similar and the first target point and the second target point having a close proximity, establishing a second cluster in response to the third velocity and the fourth velocity being similar and the third target point and the fourth target point having a close proximity, the processor further operative to add the first cluster and the second cluster to the tracking list, to track the first cluster and the second cluster in response to a second plurality of radar echoes, to identify the first cluster as a dynamic object in response to an average first velocity and the second cluster as a static object in response to an average second velocity, and to remove the second cluster from the tracking list in response to the second cluster being identified as a static object.

8. The apparatus of claim 7 wherein the first velocity indicates a first direction and a first speed, the second velocity indicates a second direction and a second speed, the third velocity indicates a third direction and a third speed, and the fourth velocity indicates a fourth direction and a fourth speed.

9. The apparatus of claim 7 wherein the first target point and the second target point being proximate is indicated by an average distance over a time duration.

10. The apparatus of claim 7 wherein the first target point and the second target point are deemed proximate in response to an average first velocity and an average second velocity.

* * * * *